(No Model.)

J. GRAHAM.
COUPLING FOR AIR BRAKES.

No. 498,705. Patented May 30, 1893.

Witnesses:

Inventor.
John Graham

UNITED STATES PATENT OFFICE.

JOHN GRAHAM, OF WILMERDING, PENNSYLVANIA.

COUPLING FOR AIR-BRAKES.

SPECIFICATION forming part of Letters Patent No. 498,705, dated May 30, 1893.

Application filed February 13, 1893. Serial No. 462,173. (No model.)

*To all whom it may concern:*

Be it known that I, JOHN GRAHAM, a citizen of the United States, residing at Wilmerding, in the county of Allegheny and State of Pennsylvania, have invented certain new and useful Improvements in Couplings for Air-Brakes; and I do hereby declare the following to be a full, clear, and exact description of the invention, such as will enable others skilled in the art to which it pertains to make and use the same, reference being had to the accompanying drawings, which form a part of this specification.

My invention relates to an improved coupling for air brakes, and consists in certain details of construction, and combination of parts as will be fully described hereinafter.

Figure 1:
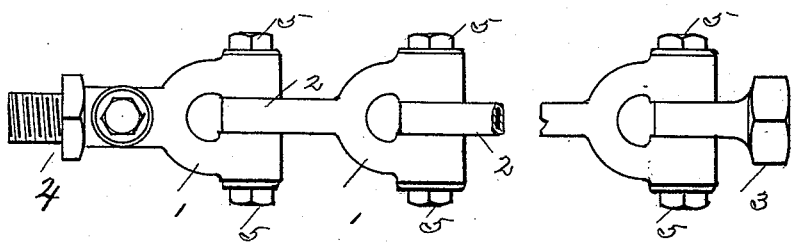
Figure 2:
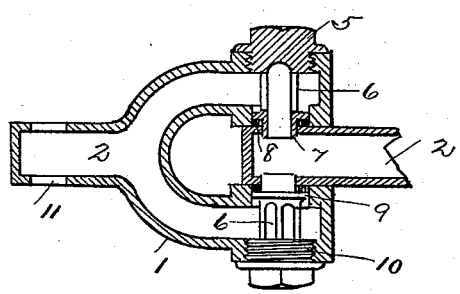

In the accompanying drawings Figure 1 is a plan view of my improved coupling, which is constructed in accordance with my invention. Fig. 2 is an enlarged sectional plan view of a portion of the same showing the interior construction.

To construct a coupling in accordance with my invention I provide any number of sections 1, consisting of a yoke formed at one end, and an eye or coupling 2 at the other. Each of these sections 1, are cast hollow, and the coupling end 2 formed with openings 11, at each side, while the yoke is formed with openings of a larger diameter on its inner sides. To couple these sections together the coupling 2 of the one section is placed between the yoke of the other, and two nuts 5 of peculiar construction fitted in threaded openings formed in each side of the yoke, and a portion of the said nuts projecting through the openings 11 formed in the coupling 2. Each of these nuts consists in a nut 5 having a threaded portion to engage with the yoke, an inwardly projecting portion 7, extending into the openings 11, several openings 6 communicating with the interior passage, and a flange 9 adapted to bear against a washer 8 arranged intermediate between the said flange, and the face of the coupling 2, thereby making an air tight connection between the two sections. Several of these sections are coupled together in this manner, and one section at the end provided with a male threaded coupling 4, and the other end with a female threaded coupling 3. By thus constructing an air brake coupling for use between railway cars, the same is made flexible, and strong, and will take the place of the ordinary rubber hose connections now in common use.

Having thus described my invention, what I claim, and desire to secure by Letters Patent, is—

The herein described flexible coupling for connections between railway cars, consisting of the sections 1, each of which is constructed with a yoke and stem 2, substantially as described, the nuts 5 arranged at each side of the yoke and adapted to engage the stems; the openings, 6, formed in the said nuts the flanges, 9, and washers, 8, intermediate of the said flanges and the faces of the stems, 2, the male coupling member 4, and female coupling member 3 attached to each end of the device; all arranged and combined for service substantially as and for the purpose described.

In testimony that I claim the foregoing I hereunto affix my signature this 31st day of December, A. D. 1892.

JOHN GRAHAM. [L. S.]

In presence of—
JAS. J. MCAFEE,
M. E. HARRISON.